(12) United States Patent
Shelton et al.

(10) Patent No.: US 10,374,471 B2
(45) Date of Patent: Aug. 6, 2019

(54) METHODS, SYSTEMS, AND APPARATUS FOR REDUCING COGGING TORQUE IN AN ELECTRIC MACHINE

(75) Inventors: Kerry B Shelton, Fort Wayne, IN (US); Subhash Marutirao Brahmavar, Fort Wayne, IN (US); Marshall Miers, Fort Wayne, IN (US); Ludovic Andre Chretien, Columbia City, IN (US)

(73) Assignee: Regal Beloit America, Inc., Beloit, WI (US)

( * ) Notice: Subject to any disclaimer, the term of this patent is extended or adjusted under 35 U.S.C. 154(b) by 1051 days.

(21) Appl. No.: 13/560,263

(22) Filed: Jul. 27, 2012

(65) Prior Publication Data
US 2014/0028148 A1    Jan. 30, 2014

(51) Int. Cl.
H02K 1/16    (2006.01)
H02K 1/14    (2006.01)
H02K 29/03   (2006.01)

(52) U.S. Cl.
CPC .......... H02K 1/146 (2013.01); H02K 29/03 (2013.01)

(58) Field of Classification Search
CPC ......... H02K 1/276; H02K 1/148; H02K 1/146
USPC ................. 310/156.53, 216.97, 93
See application file for complete search history.

(56) References Cited

U.S. PATENT DOCUMENTS

| | | | |
|---|---|---|---|
| 5,220,228 A * | 6/1993 | Sibata | H02K 21/16 310/156.46 |
| 6,181,035 B1 | 1/2001 | Acquaviva | |
| 6,194,800 B1 * | 2/2001 | Maruyama | F04D 19/048 310/216.009 |
| 6,408,502 B1 | 6/2002 | Brahmavar et al. | |
| 6,891,298 B2 | 5/2005 | Gary | |
| 6,946,760 B2 | 9/2005 | Crapo et al. | |
| 7,382,076 B2 * | 6/2008 | Miyamori | G11B 17/028 310/216.004 |
| 7,408,279 B2 | 8/2008 | Murkami et al. | |
| 8,207,648 B2 * | 6/2012 | Li | H02K 1/146 310/216.069 |
| 8,714,948 B2 * | 5/2014 | Baba | H02K 1/276 417/423.7 |
| 2003/0107290 A1 * | 6/2003 | De Filippis | H02K 1/146 310/216.008 |

(Continued)

FOREIGN PATENT DOCUMENTS

CN    201515265 U  *  6/2010  ............... H02K 1/16

OTHER PUBLICATIONS

CN 201515265 U machine translation Mar. 3, 2018.*

*Primary Examiner* — Quyen P Leung
*Assistant Examiner* — Leda T Pham
(74) *Attorney, Agent, or Firm* — Armstrong Teasdale LLP

(57) ABSTRACT

An interior permanent magnet machine is described. The machine includes a rotor rotatable about a central machine axis. The rotor includes a plurality of permanent magnet openings and a plurality of permanent magnets disposed therein. The permanent magnet openings are separated by rotor webs configured to facilitate reducing leakage flux through the rotor webs. The machine also includes a stator disposed coaxially with the rotor and separated from the rotor by a circumferential air gap. The stator includes a plurality of stator teeth that define a plurality of stator slots therebetween. The stator teeth include a stator tooth tip configured to facilitate reducing cogging torque and torque ripple.

10 Claims, 6 Drawing Sheets

(56) References Cited

U.S. PATENT DOCUMENTS

2006/0279158 A1* 12/2006 Kim .................... H02K 1/08
310/216.108

* cited by examiner

METHODS, SYSTEMS, AND APPARATUS FOR REDUCING COGGING TORQUE IN AN ELECTRIC MACHINE

BACKGROUND OF THE INVENTION

The subject matter described herein relates generally to electric machines, and more specifically, to methods, systems, and apparatus for reducing cogging torque in an electric machine.

Electric machines, including electric generators and electric motors, are used in countless varieties and applications worldwide. Typically, the rotational force and torque generated within an electric motor is delivered to an application by a rotor shaft. The torque generated is a product of current applied to the motor and an electromagnetic field maintained in the motor. This delivered torque varies as a function of time and position of the rotor. Magnets on the rotor generate a rotor magnetic field and current on a stator winding generates a stator magnetic field. When the rotor generated magnetic field approaches the stator generated magnetic field, the torque is positive, and when the rotor magnetic field leaves the stator magnetic field the torque is negative. The torque produced is therefore non-uniform and known to those in the art as torque ripple. A second component of non-uniform torque is known as cogging torque. Cogging torque is present because the rotor magnets prefer to line up with the stator teeth. In some applications, the ripple and/or cogging torque produces objectionable vibration at the motor shaft resulting in end product noise. Furthermore, ripple and/or cogging torque may produce undesirable stator torsional and/or radial forces One example of such an application occurs when a motor drives an end product, for example, a fan. Cogging torque produces vibrations which are transmitted to machine components such as the motor and fan mounting. These vibrations produce undesirable noise as the cogging frequencies couple with 'application' resonances. In addition to acoustic noise, continued exposure over time to such vibrations may loosen motor and fan assemblies, and ultimately may cause a motor failure. Isolation and damping systems, for example, an isolated rotor, may be employed to minimize the effects of the vibrational energy induced into the motor and fan system.

Furthermore, in applications that include a rotor that includes permanent magnets, such as a brushless direct current (BLDC) motor or a brushless alternating current (BLAC) motor, a resultant noise due to inherent cogging torque is caused by rotor permanent magnets moving past stator teeth. Cogging torque may be reduced by including a skewed magnetic field. However, it is currently difficult to apply a skewed magnetic field in a motor that includes an interior permanent magnet rotor. Adding sub-slots to the stator teeth will reduce the composite peak-to-peak cogging torque, but adds higher frequency components that can excite system resonances in some applications. Cogging torque at frequencies other than the fundamental frequency may also cause motor vibration and generate noise in an end product. Furthermore, cogging torque may be reduced by using a resilient rotor construction. However, a resilient rotor significantly increases a cost of the motor, while adding a potential failure mechanism to the motor. In addition, there may also be undesirable interactions between the magnetic field generated by the stator windings and the back EMF of the PM motor that may create torque pulsations (i.e. torque ripple) rich with harmonic content.

Moreover, efficiency of BLDC and BLAC motors with permanent magnets embedded in the rotor (e.g., an interior permanent magnet rotor) is typically limited due to leakage flux of individual permanent magnets through the rotor core.

BRIEF DESCRIPTION OF THE INVENTION

In one aspect, an interior permanent magnet machine is provided. The machine includes a rotor rotatable about a central machine axis. The rotor includes a plurality of permanent magnet openings and a plurality of permanent magnets disposed therein. The permanent magnet openings are separated by rotor webs configured to facilitate reducing leakage flux through the rotor webs. The machine also includes a stator disposed coaxially with the rotor and separated from the rotor by a circumferential air gap. The stator includes a plurality of stator teeth that define a plurality of stator slots therebetween. The stator teeth include a stator tooth tip configured to facilitate reducing cogging torque.

In another aspect, a stator for use in an electric machine is provided. The stator includes an outer ring concentric to an axial center line of the electric machine. The stator also includes a plurality of stator teeth extending radially inward from the outer ring toward the axial center line. Each of the plurality of stator teeth includes a stator tooth tip having a first surface. The stator tooth tip includes a first end, a second end, and a center section therebetween. The first end and the second end are tapered away from the axial center line such that a distance between the first surface and the axial center line is greater at the first end and the second end than at the center section.

In yet another aspect, a method for reducing cogging torque in an electric machine that includes an interior permanent magnet rotor that is concentric to a stator is provided. The stator includes a plurality of stator teeth each including a stator tooth tip. The method includes determining an angle of a first end of the stator tooth tip relative to a center section of the stator tooth tip that results in a graded air gap when assembled with the rotor, the graded air gap reduces cogging torque and changes cogging frequency favorably to reduce noise in the electric machine.

DETAILED DESCRIPTION OF THE INVENTION

The methods, systems, and apparatus described herein facilitate reducing noise in an electric motor and its intended application without increasing manufacturing cost or complexity, and with minimal adverse effects on motor efficiency when compared to other options. The methods, systems, and apparatus described herein also facilitate reducing motor-to-motor variation effect on noise. For example, a stator tooth included within a stator lamination used in an electric motor may be shaped in such a way that an amplitude of cogging torque at key frequencies (fundamental and harmonics of various cogging sources) is reduced so that noise in the application is reduced. In addition, the stator tooth shape may be shaped to reduce higher order back EMF harmonics effecting torque ripple generated primarily by the current applied to the stator windings. Furthermore, a magnet positioning opening in a lamination of an interior permanent magnet rotor may be sized and shaped in such a way that the leakage flux between north and south poles of each permanent magnet is minimized, and yet laminations are easily manufactured, and rotor-to-rotor variation is reduced. Reducing leakage flux facilitates increasing motor efficiency.

Figure 1:
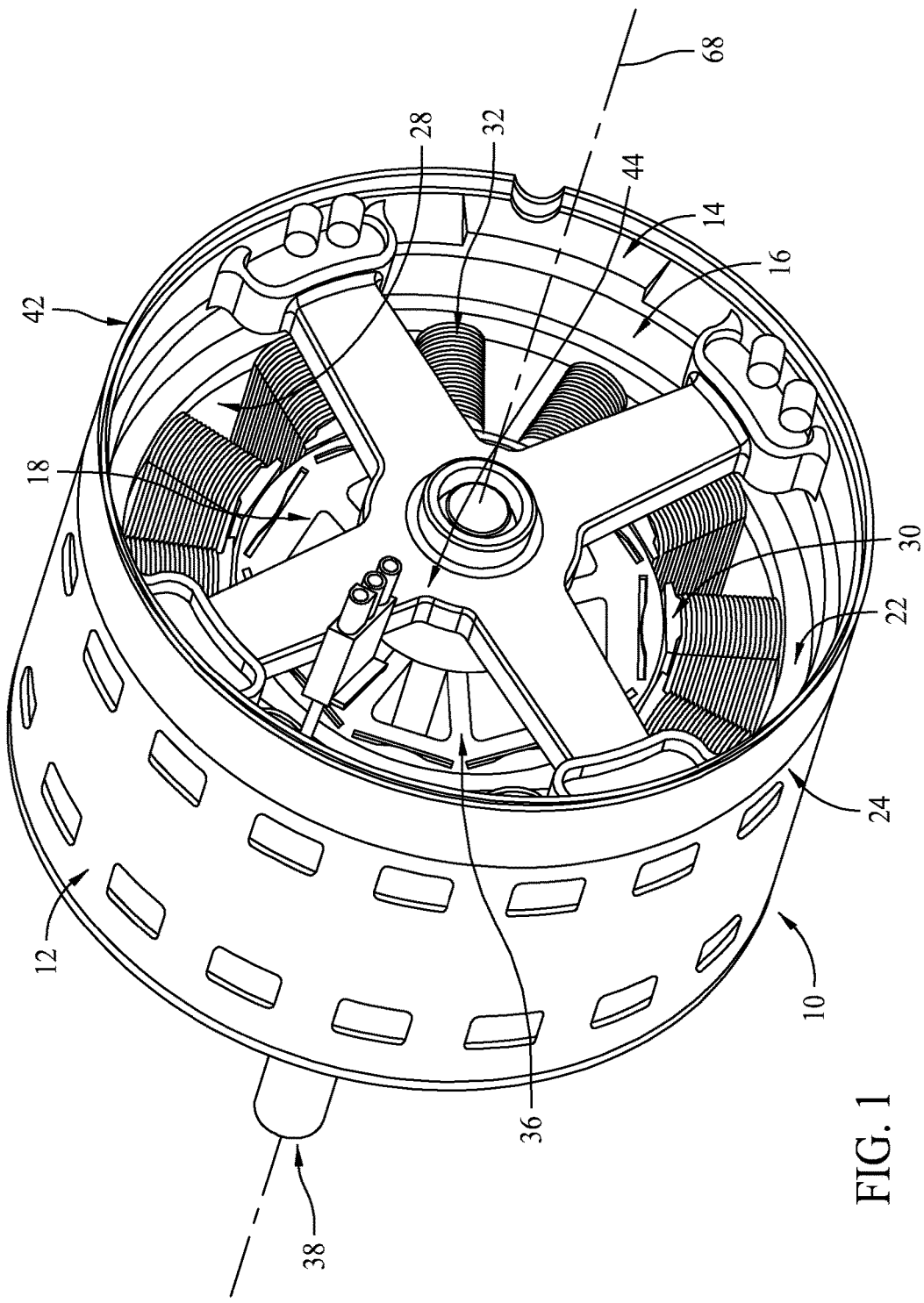
FIG. 1 is an illustration of a portion of an exemplary electric motor.

FIG. 1 is an illustration of a portion of an exemplary electric motor 10. Motor 10 may include an electronically commutated motor (ECM), a brushless direct current (BLDC) motor, a brushless alternating current (BLAC) motor, or any other suitable electric motor. Furthermore, although illustrated in conjunction with BLAC motor 10, the methods, systems, and apparatus described herein are not limited to use with only BLAC motor 10, rather, the methods, systems, and apparatus described herein may be applied to any suitable electric motor. Motor 10 includes a motor assembly housing 12. Motor 10 includes a motor assembly 14 that includes a stationary assembly 16 and a rotatable assembly 18. Motor assembly housing 12 defines an interior 22 and an exterior 24 of motor 10 and is configured to at least partially enclose and protect motor assembly 14. Stationary assembly 16 includes a stator core 28, which includes a plurality of stator teeth 30 and a plurality of windings 32 wound around stator teeth 30. In an exemplary embodiment, stationary assembly 16 is a three phase salient pole stator assembly, stator core 28 is formed from a stack of laminations made of a highly magnetically permeable material, and windings 32 are wound on stator core 28 in a manner known to those of ordinary skill in the art. Rotatable assembly 18 includes a permanent magnet rotor core 36 and a shaft 38. In the exemplary embodiment, rotor core 36 is formed from a stack of laminations made of a magnetically permeable material and is substantially received in a central bore of stator core 28. Rotor core 36 and stator core 28 are illustrated as being solid in FIG. 1 for simplicity, their construction being well known to those of ordinary skill in the art. While FIG. 1 is an illustration of a three phase motor, the methods and systems described herein may be applied to motors having a single phase or multiple phases.

In the exemplary embodiment, motor 10 also includes an endshield 42 coupled to motor assembly housing 12. Endshield 42 includes an opening 44 configured to support shaft 38 of rotatable assembly 18. Endshield 42 is also configured to secure stationary assembly 16 and rotatable assembly 18 within motor assembly housing 12. In the exemplary embodiment, motor 10 is included within an air handling system. For example, motor 10 may be coupled to a fan (not shown) for moving air through an air handling system, for blowing air over cooling coils, and/or be coupled to an air conditioning compressor for driving the compressor. More specifically, motor 10 may be used in air moving applications used in the HVAC industry, for example, in residential applications using ⅓ horsepower to 1 horsepower motors and/or in commercial and industrial applications and hermetic compressor motors used in air conditioning applications. Although described herein in the context of an air handling system, motor 10 may engage any suitable work component and be configured to drive such a work component.

Figure 2:
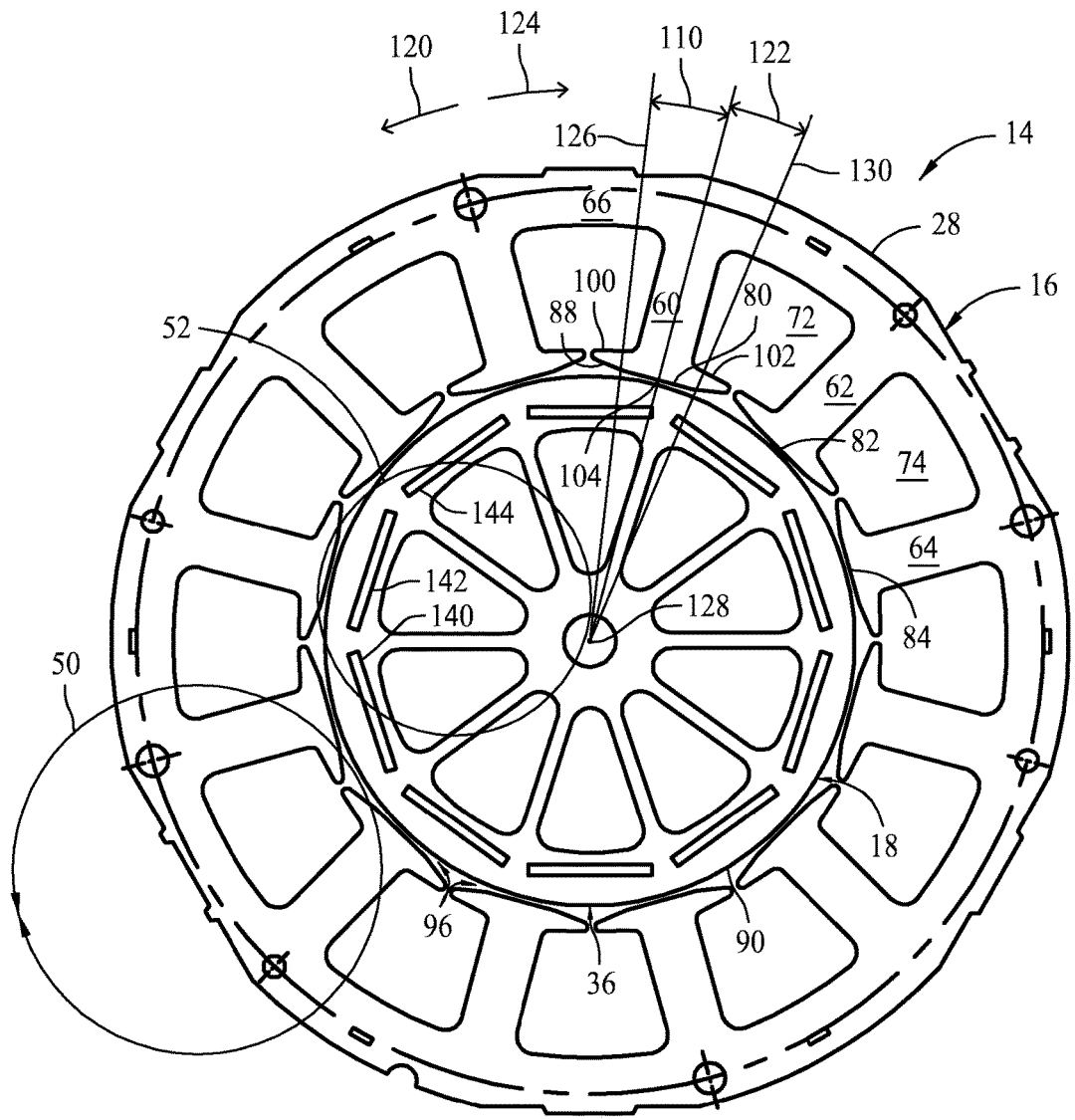
FIG. 2 is a cross sectional view of an exemplary embodiment of a motor assembly that may be included within the motor shown in FIG. 1.
Figure 3:
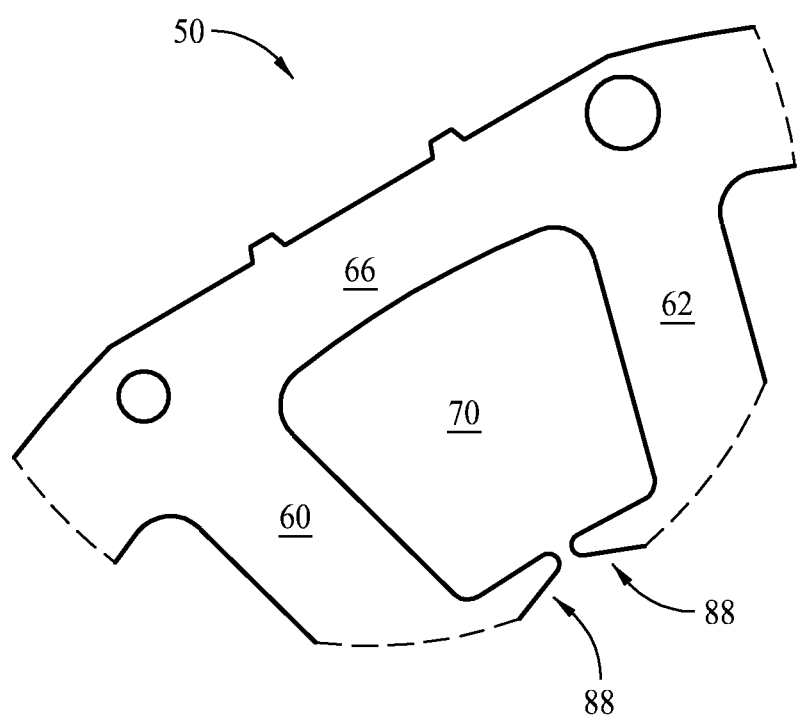
FIG. 3 is a cross sectional view of a portion of a stationary assembly that may be included within the motor shown in FIG. 1.
Figure 4:
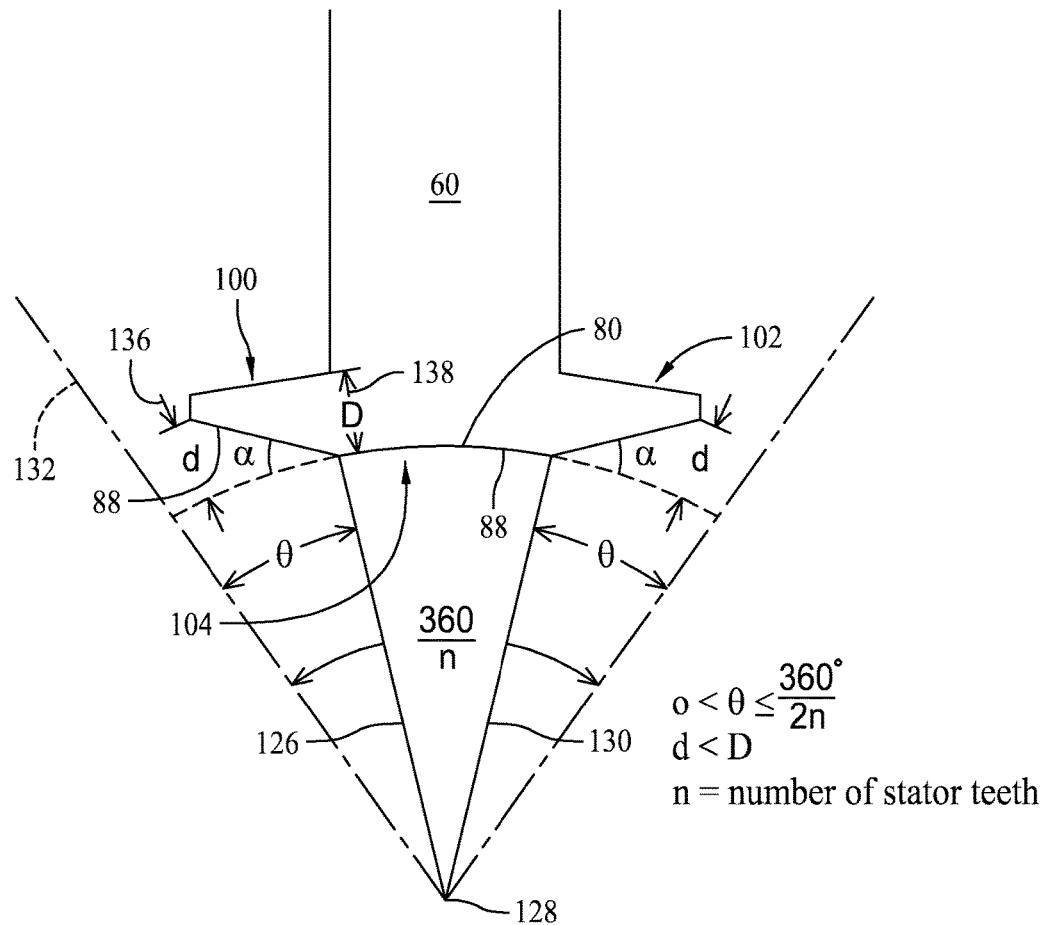
FIG. 4 is a cross sectional view of a stator tooth shown in FIG. 2.
Figure 5:
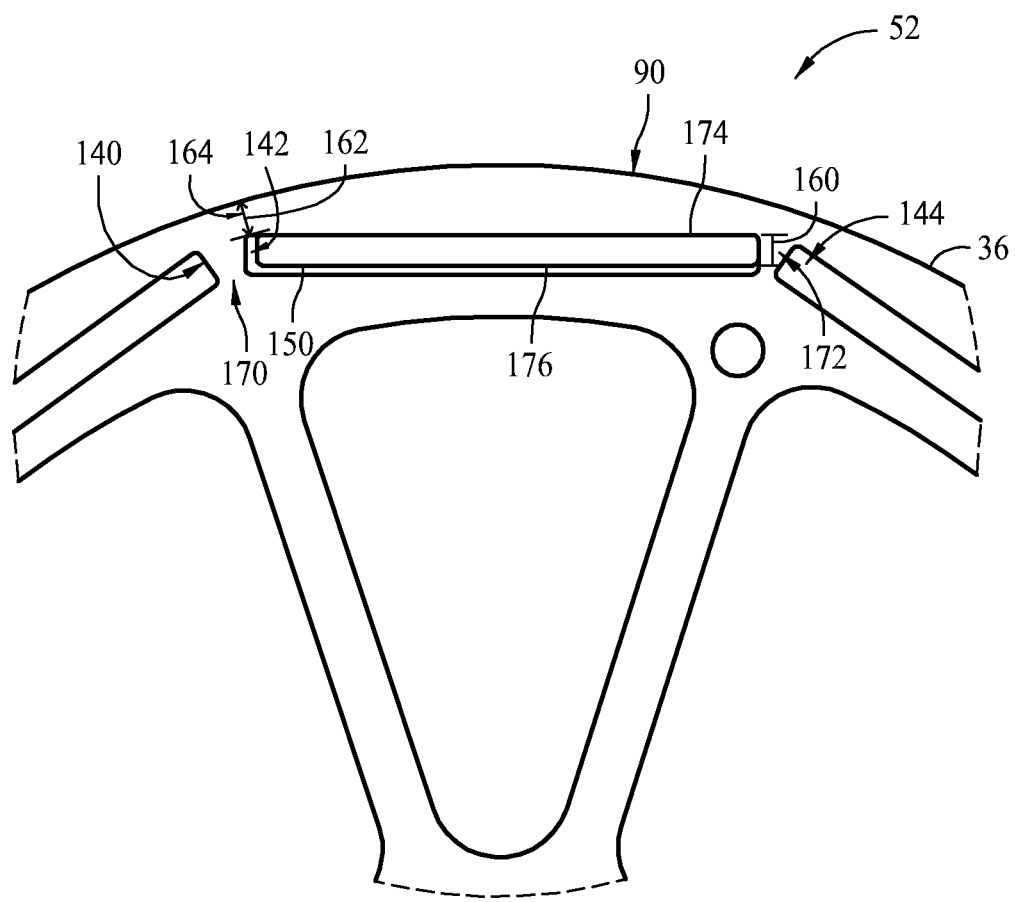
FIG. 5 is a cross sectional view of a portion of a rotatable assembly that may be included within the motor shown in FIG. 1.

FIG. 2 is a cross sectional view of an exemplary embodiment of a motor assembly, for example, motor assembly 14 (shown in FIG. 1) that may be included within motor 10 (shown in FIG. 1). As described above, motor assembly 14 includes a stationary assembly 16 and a rotatable assembly 18. FIG. 3 is a cross sectional view of a portion 50 of stationary assembly 16 (shown in FIG. 2). FIG. 4 is a cross sectional view of a stator tooth that may be included in stationary assembly 16 (shown in FIG. 2). FIG. 5 is a cross sectional view of a portion 52 of rotatable assembly 18 (shown in FIG. 2).

Stationary assembly 16 includes stator core 28. In the exemplary embodiment, stator core 28 includes a plurality of stator teeth, for example stator teeth 60, 62, and 64, that extend from an outer ring 66. Outer ring 66 is concentric about an axial center line 68 of motor 10. As described above, windings 32 (shown in FIG. 1) are wound around stator teeth 60, 62, and 64. A plurality of stator slots, for example, stator slots 72 and 74 are defined between stator teeth 60, 62, and 64. Each of the plurality of stator teeth includes a tooth tip. For example, stator tooth 60 includes a stator tooth tip 80, stator tooth 62 includes a stator tooth tip 82, and stator tooth 64 includes a stator tooth tip 84. Stator tooth tips 80, 82, and 84 each include an interior surface 88.

In the exemplary embodiment, interior surface 88 of stator tooth tips 80, 82, and 84 are shaped to reduce the amplitude of cogging torque at specific frequencies so that acoustical noise in the application where motor 10 is used is reduced. In the exemplary embodiment, the amplitude of cogging torque at the commonly defined or native cogging torque frequency is reduced while also reducing the amplitude of the cogging torque increase at other frequencies, for example, a pole pass frequency and/or a slot order frequency. In the specific embodiment of motor 10, which includes a ten pole rotor and twelve stator slots, the fundamental frequency of the native cogging torque is equal to sixty times the revolutions per minute (RPM) frequency of motor 10 (e.g., the least common multiple of ten and twelve). Furthermore, the cogging torque will include other frequencies, for example, at a pole pass frequency and a slot order frequency with amplitude dependent on motor design and normal motor-to-motor manufacturing variances. In this example, the pole pass frequency is equal to ten times the RPM frequency and the slot order frequency is equal to twelve times the RPM frequency. Multiples of all of these cogging sources (harmonics) are also common with amplitudes of all frequencies dependent on motor design. In the exemplary embodiment, interior surface 88 is shaped such that the amplitude of the cogging torque at the native frequency is reduced with minimal increase in the amplitude of the fundamental cogging torque at other frequencies, including the pole pass frequency and/or the slot order frequency. In addition, the tooth shape reduces and/or eliminates the higher harmonic frequencies of the stator winding back EMF interacting with the applied stator electromagnetic field, which provides a reduction in electromagnetic induced torque ripple.

Rotatable assembly 18 is substantially received in a central bore of stationary assembly 16 such that an outer surface 90 of rotor core 36 is separated from interior surface 88 of stator teeth 60, 62, and 64 by an air gap 96. Stator teeth 60, 62, and 64 are configured to facilitate reducing an amplitude of the cogging torque of motor 10. More specifically, interior surface 88 of stator tooth tips 80, 82, and 84 have a cross-sectional profile that causes air gap 96 to change during operation of motor 10. Cogging torque naturally exists in an electric motor because the magnetic energy that is stored in air gap 96 varies according to an angular position of rotor core 36 with respect to stationary assembly 16. Due to a shape of interior surface 88 of tooth tips 80, 82, and 84, air gap 96 also varies according to a distance between interior surface 88 and outer surface 90. More specifically, a backward curvature of portions of stator tooth tip 80 increases air gap 96 at ends of stator tooth tip 80 as compared to air gap 96 at a center of stator tooth 60 resulting in a graded air gap. The graded air gap facilitates reducing cogging torque in such a way that noise is suppressed in the end product. The air gap 96 is varied enough to effectively reduce the amplitude of cogging torque at the fundamental frequency of motor 10, but not enough to introduce additional noise issues to motor 10 and the end product. In the exemplary embodiment, air gap 96 is varied such that the amplitude of the native cogging torque fundamental is reduced, and the higher harmonic back EMF is reduced, with reduced effect on fundamental cogging torque increase at the pole pass and slot order frequencies.

In the exemplary embodiment, stator tooth tip 80 includes a first end 100, a second end 102, and a center section 104. First end 100 is located a first distance 110 in a first circumferential direction 120 from center section 104 of stator tooth tip 80. Second end 102 is located a second distance 122 in a second circumferential direction 124 from center section 104 of stator tooth tip 80, wherein first circumferential direction 120 is opposite to second circumferential direction 124. A first line 126 illustrates a division between first end 100 and center section 104. Line 126 extends between a center 128 of stationary assembly 16 through a point on interior surface 88 where center section 104 transitions to first end 100. A second line 130 similarly illustrates a division between second end 102 and center section 104.

In the exemplary embodiment, air gap 96 is larger between interior surface 88 of first end 100 and outer surface 90 than between interior surface 88 of center section 104 and outer surface 90. Similarly, air gap 96 is larger between interior surface 88 of second end 102 and outer surface 90 than between interior surface 88 of center section 104 and outer surface 90. In the exemplary embodiment, interior surface 88 of first end 100 is angled at an angle α with respect to center section 104 such that air gap 96 between rotor core 36 and stator tooth tip 80 increases as a circumferential distance from center section 104 increases. In an alternative embodiment, interior surface 88 of first end 100 includes a first curve configured such that air gap 96 increases as a circumferential distance from center section 104 increases. Angle α of first end 100 relative to center section 104, and/or the curve of first end 100, is determined based at least partially on a frequency content of the cogging torque wave generated by motor 10. Second end 102 is configured substantially similarly to first end 100.

FIG. 4 is a cross sectional view of a stator tooth, for example, stator tooth 60 (shown in FIG. 3). A first angle θ is an angle measured between first line 126 (shown in FIG. 2) and a third line 132. First line 126 extends between center 128 of stationary assembly 16 to an intersection between center section 104 and first end 100. Third line 132 extends between center 128 and a point equidistant from first end 100 of stator tooth 60 and an adjacent stator tooth. A radial distance 136 is defined as a maximum distance between interior surface 88 and a circle centered at center 128 of a diameter equal to a distance from center 128 to interior surface 88 of center section 104. Radial distance 136 may also be described as a difference between a maximum air gap 96 and a minimum air gap 96 over tooth tip 80. A distance 138 is a thickness of center section 104. Angle θ and distance 136 are optimized to reduce cogging torque and third harmonic content of the cogging torque. In the exemplary embodiment, angle θ corresponds to a number of stator teeth and rotor poles. For example, angle θ may be determined by:

$$0 < \theta \le \frac{360°}{2n},$$

where n=number of stator teeth. Furthermore, in the exemplary embodiment, radial distance 136 is less than distance 138.

Referring now to FIG. 5, in the exemplary embodiment, rotor core 36 includes a plurality of permanent magnet openings defined therein, for example, permanent magnet openings 140, 142, and 144. A permanent magnet is positioned within each of permanent magnet openings 140, 142, and 144, for example, a permanent magnet 150 is positioned within opening 142. Opening 142 is sized so that each lamination used to form rotor core 36 is manufacturable and movement of permanent magnet 150 within opening 142 is reduced. In other words, openings 140, 142, and 144 are configured to restrict movement of permanent magnets positioned therein. Because of variability in the magnet manufacturing process, actual magnet width and thickness may vary. There are also manufacturing tolerances introduced to rotor core 36 by the manufacturing process of punching magnet openings, for example, magnet openings 140, 142, and 144, and stacking of laminations that form rotor core 36. Therefore, sufficient clearance is provided between a maximum magnet size and a minimum magnet opening size.

A ratio of a thickness 160 of permanent magnet 150 to a thickness 162 of a bridge portion 164 between an outer circumference of permanent magnet 150 nearest to outer surface 90 of rotor core 36 is equal to or greater than two. In the exemplary embodiment, rotor core 36 includes a plurality of rotor webs, for example, rotor webs 170 and 172. Rotor webs 170 and 172 are portions of rotor core 36 that separate openings 140 and 142, and openings 142 and 144, respectively. In the exemplary embodiment, rotor webs 170 and 172 are substantially trapezoidal in shape. Rotor webs 170 and 172 are configured such that the laminations used to form rotor core 36 may be manufactured using a standard punching die. Rotor webs 170 and 172 are designed and sized in such a way that a leakage flux, through rotor webs 170 and 172, is reduced. Reducing leakage flux increases motor efficiency by reducing the flux wasted as leakage flux, therefore, increasing the flux used by motor 10 to rotate rotatable assembly 18.

Each permanent magnet, for example, permanent magnet 150, includes a north pole surface 174 and a south pole surface 176. In the exemplary embodiment, the polarity of the permanents magnets within rotor core 36 alternates between north pole surface 174 positioned facing outer surface 90 and south pole surface 176 facing outer surface 90. In order to minimize leakage flux between north pole surface 174 and south pole surface 176 of permanent magnet 150, rotor webs 170 and 172 are thin enough to facilitate magnetic saturation of rotor webs 170 and 172. In certain embodiments, the thickness of rotor webs 170 and 172 is constrained by manufacturing capabilities. For example, a standard laminate punching die may be capable of punching two openings separated by a remaining section that is one to one and a half times the thickness of the lamination. Typically, this remaining section between openings would be too thick to facilitate magnetic saturation and therefore minimize leakage flux. If rotor webs 170 and 172 are trapezoidal, the larger end provides manufacturing integrity, while the smaller end facilitates magnetic saturation of rotor webs 170 and 172.

Figure 6:
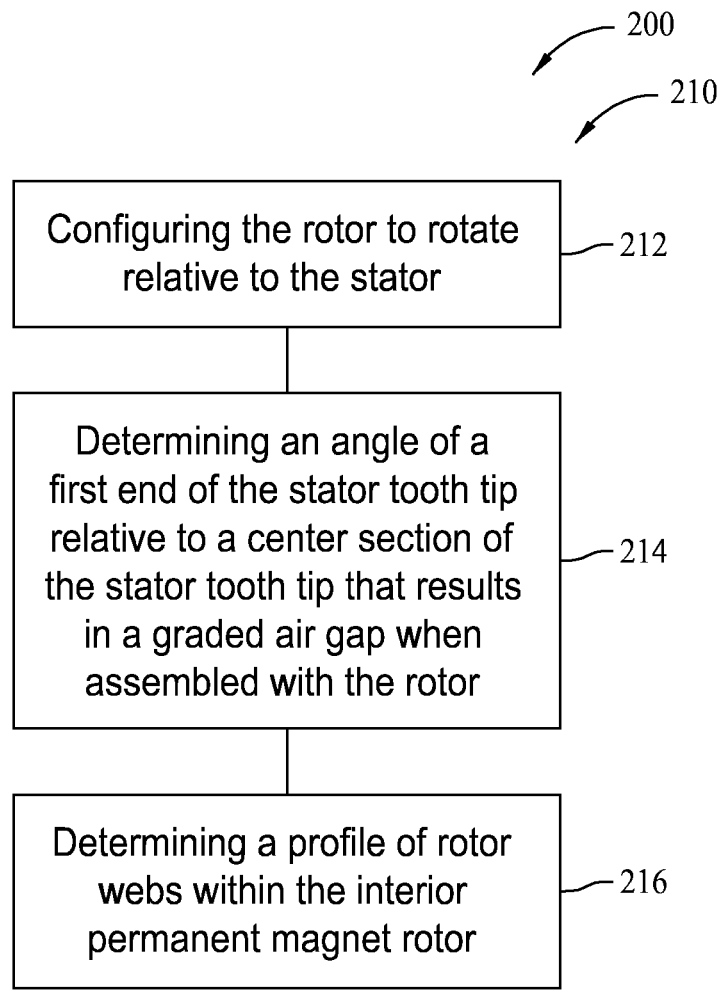
FIG. 6 is a flow chart of an exemplary method for reducing noise in an electric motor.

FIG. 6 is a flow chart 200 of an exemplary method 210 for reducing cogging torque in an electric motor, for example, electric motor 10 (shown in FIG. 1). Method 210 includes configuring 212 a rotor, for example, rotatable assembly 18 (shown in FIG. 1) to rotate relative to a stator, for example, stationary assembly 16 (shown in FIG. 1). Method 210 also includes determining 214 an angle of a first end of the stator tooth tip, for example, first end 100 of stator tooth tip 80 (shown in FIG. 2), relative to a center section of the stator tooth tip, for example, center section 104 of stator tooth tip 80 (shown in FIG. 2). The angled surface results in a graded air gap, for example, air gap 96 (shown in FIG. 2) when stationary assembly 16 (shown in FIG. 2) is assembled with rotatable assembly 18 (shown in FIG. 2). The graded air gap 96 reduces cogging torque to reduce vibration in electric motor 10 and/or noise in a work component coupled to motor 10.

Determining 214 the angle of first end 100 of stator tooth tip 80 relative to center section 104 of stator tooth tip 80 includes determining a first angle θ that is an angle measured from a first line to a second line, for example, from first line 126 (shown in FIG. 4) to third line 132 (shown in FIG. 4). First line 126 extends between an axial center of the stator, for example, center 128 (shown in FIG. 4) and an intersection between center section 104 and first end 100. Third line 132 extends between center 128 and a point equidistant from first end 100 of stator tooth 60 and an adjacent stator tooth. In the exemplary embodiment, the angle of first end 100 of stator tooth tip 80 relative to center section 104 of stator tooth tip 80 is at least partially based on the first angle θ.

In the exemplary embodiment, first angle θ is determined by:

$$0 < \theta \leq \frac{360°}{2n},$$

where n=a number of stator teeth in electric motor 10.

Determining 214 the angle of first end 100 of stator tooth tip 80 relative to center section 104 of stator tooth tip 80 comprises determining a radial distance, for example, radial distance 136 (shown in FIG. 4). Radial distance 136 is defined as a difference between a maximum air gap and a minimum air gap between stator tooth tip 80 and the rotor. The angle of the first end 100 of the stator tooth tip 80 relative to the center section 104 of the stator tooth tip 80 is determined at least partially based on radial distance 136. In the exemplary embodiment, determining radial distance 136 includes determining a thickness of the center section, for example, distance 138 (shown in FIG. 4). To reduce cogging torque, radial distance 136 is determined such that radial distance 136 is less than the thickness 138 of center section 104.

Method 210 may also include determining 216 a profile of rotor webs, for example, rotor webs 170 and/or 172 (shown in FIG. 5), included within rotatable assembly 18. Rotor webs 170 and/or 172 configured to facilitate reducing leakage flux through rotor webs 170 and/or 172. The profile of rotor webs 170 and/or 172 is determined to facilitate magnetic saturation of rotor webs 170 and/or 172 and is at least partially dependent on manufacturing capabilities.

The methods, systems, and apparatus described herein facilitate reducing noise in an application driven by a motor while maintaining, or minimally reducing, an efficiency of the motor. Electromagnetic design of a stationary assembly and a rotatable assembly used in an electric motor facilitate reducing noise and increasing manufacturability, while remaining cost effective. The methods, systems, and apparatus described herein include a stator tooth shaped such that ends of tooth tips are at a larger radius than a center of the tooth resulting in a graded air gap when assembled with a rotor that is concentric to the stator. The graded air gap reduces the amplitude of cogging torque at various frequencies to reduce noise in the application.

The methods, systems, and apparatus described herein also facilitate efficient and economical assembly of a motor that includes an interior permanent magnet rotor. Permanent magnet openings within the rotor are configured to facilitate reducing leakage flux by allowing magnetic saturation of rotor webs within the rotor core. Permanent magnet openings are also configured to account for manufacturing capabilities. Exemplary embodiments of the methods, systems, and apparatus are described and/or illustrated herein in detail. The methods, systems, and apparatus are not limited to the specific embodiments described herein, but rather, components of each apparatus, as well as steps of each method, may be utilized independently and separately from other components and steps described herein. Each component, and each method step, can also be used in combination with other components and/or method steps. Furthermore, although described herein with respect to an electric motor, the methods, systems, and apparatus described herein are applicable to all electric machines, including electric motors and electric generators.

Although specific features of various embodiments of the invention may be shown in some drawings and not in others, this is for convenience only. In accordance with the principles of the invention, any feature of a drawing may be referenced and/or claimed in combination with any feature of any other drawing.

When introducing elements/components/etc. of the systems and apparatus described and/or illustrated herein, the articles "a," "an," "the," and "said" are intended to mean that there are one or more of the element(s)/component(s)/etc. The terms "comprising," "including," and "having" are intended to be inclusive and mean that there may be additional element(s)/component(s)/etc. other than the listed element(s)/component(s)/etc.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. An interior permanent magnet machine comprising:
a rotor rotatable about a central machine axis and comprising a plurality of permanent magnet openings and a plurality of permanent magnets disposed therein; and
a stator disposed coaxially with said rotor, said stator comprising a plurality of stator teeth that define a plurality of stator slots therebetween, each of said plurality of stator teeth comprising a stator tooth tip, said stator tooth tip comprising an interior surface configured to facilitate reducing cogging torque, said stator separated from said rotor by a radial air gap between said rotor and said interior surface, said stator tooth tip comprising a circumferential first end, a circumferential second end, and a center section therebetween, said center section concentric about said rotor such that said radial air gap is constant within said center section, said interior surface of said circumferential first end and said circumferential second end are planar and are angled relative to said interior surface of said center section such that said radial air gap between said rotor and said stator tooth tip increases as a circumferential distance from said center section increases, said circumferential first end and said circumferential second end each comprising a planar circumferential end tip having a radial thickness, a radial distance is a distance between a maximum air gap at said planar circumferential end tip and said radial air gap within said center section, a first angle $\theta$ that is an angle measured from a first line to a second line, the first line extends between an axial center of the stator and an intersection between said center section and at least one of said circumferential first end and said circumferential second end and the second line extends between the axial center of the stator and a point equidistant from said planar circumferential end tip of at least one of said circumferential first end and said circumferential second end of the stator tooth and said planar circumferential end tip of at least one of said circumferential first end and said circumferential second end of an adjacent stator tooth, wherein an angle $\alpha$ of said interior surface of said circumferential first end relative to said interior surface of said center section is determined based at least partially on a frequency content of a cogging torque generated by the machine, said first angle $\theta$, and said radial distance, wherein said radial thickness of said planar circumferential end tips are determined based at least partially on a frequency content of a torque wave generated by the electric machine.

2. A machine in accordance with claim 1, wherein said circumferential first end located a first distance in a first circumferential direction from said center section of said stator tooth tip and said circumferential second end located a second distance in a second circumferential direction from said center section of said stator tooth tip, the first circumferential direction opposite to the second circumferential direction.

3. A machine in accordance with claim 2, wherein said radial air gap is larger between said rotor and said circumferential first end of said stator tooth tip than said radial air gap is between said rotor and said center section of said stator tooth tip.

4. A machine in accordance with claim 2, wherein said radial air gap is larger between said rotor and said circumferential second end of said stator tooth tip than said radial air gap is between said rotor and said center section of said stator tooth tip.

5. A machine in accordance with claim 1, wherein the angle of said circumferential first end relative to said interior surface of said center section is determined to facilitate reducing an amplitude of the cogging torque at least one of a native frequency, a pole pass frequency, a slot order frequency, and a stator winding back EMF harmonic frequency.

6. A machine in accordance with claim 1, wherein said stator tooth tip is configured to at least one of reduce and maintain an amplitude of the cogging torque at multiple harmonic frequencies.

7. A machine in accordance with claim 1, wherein said permanent magnet openings are separated by rotor webs configured to facilitate reducing leakage flux through said rotor webs.

8. A machine in accordance with claim 7, wherein a profile of said rotor webs is substantially trapezoidal.

9. A machine in accordance with claim 1, wherein said plurality of permanent magnets are centered within said plurality of permanent magnet openings, said plurality of permanent magnet openings configured to restrict movement of said plurality of permanent magnets disposed therein.

10. A machine in accordance with claim 1, wherein said radial distance is greater than said radial thickness of said planar circumferential end tips.

* * * * *